United States Patent
Chen et al.

(10) Patent No.: US 12,039,943 B1
(45) Date of Patent: Jul. 16, 2024

(54) BACKLIGHT CONTROL DEVICE AND METHOD BASED ON SOUND FEATURE LID STATE DETECTION

(71) Applicant: HIMAX TECHNOLOGIES LIMITED, Tainan (TW)

(72) Inventors: Keng-Chih Chen, Tainan (TW); Yu-Chun Huang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/381,616

(22) Filed: Oct. 18, 2023

(51) Int. Cl.
*G09G 3/34* (2006.01)
*G06F 3/16* (2006.01)

(52) U.S. Cl.
CPC ............. *G09G 3/3406* (2013.01); *G06F 3/16* (2013.01); *G09G 2320/0261* (2013.01)

(58) Field of Classification Search
CPC .................... G09G 3/16; G09G 2320/0261
USPC .......................................................... 345/204
See application file for complete search history.

(56) References Cited

U.S. PATENT DOCUMENTS

| | | | | |
|---|---|---|---|---|
| 7,502,221 B2 * | 3/2009 | Fuller | .................. | G06F 1/1626 361/679.04 |
| 10,817,246 B2 * | 10/2020 | Yao | ......................... | G06N 20/00 |
| 2020/0020328 A1 * | 1/2020 | Gordon | ................... | G10L 15/08 |

\* cited by examiner

*Primary Examiner* — Calvin C Ma
(74) *Attorney, Agent, or Firm* — Winston Hsu

(57) ABSTRACT

A backlight control device for use in an electronic device includes a motion detecting unit, a sound matching unit and a controller. The motion detecting unit is configured to detect motion of a lid section of the electronic device to generate motion data. The sound matching unit is configured to match a soundprint derived from a sound sample that is captured by a sound capture unit, to one or more sound patterns stored within in a sound pattern database to generate a lid state indication signal if the motion data indicates the motion of the lid section corresponds to a predetermined state. The controller is configured to control a backlight module of a display device of the electronic device according to the lid state indication signal.

14 Claims, 5 Drawing Sheets

|  | Lid-Close | Lid-Open |
|---|---|---|
| Preload | pattern_c1 | pattern_o1 |
| | pattern_c2 | pattern_o2 |
| | pattern_c3 | pattern_o3 |
| | pattern_c4 | pattern_o4 |
| Auto Update | pattern_c5 | pattern_o5 |
| | pattern_c6 | pattern_o6 |
| | pattern_c7 | pattern_o7 |

BACKLIGHT CONTROL DEVICE AND METHOD BASED ON SOUND FEATURE LID STATE DETECTION

BACKGROUND OF THE INVENTION

1. Field of the Invention

The present invention relates to backlight control, and more particularly, to a backlight control device and method that utilizes sound pattern matching algorithms to perform lid state detection for backlight control.

2. Description of the Prior Art

Clamshell form constitutes a specific category of design topology employed in mobile and portable electronic devices. This design typology is bifurcated into two primary sections interconnected by a mechanical hinge mechanism. Each section houses distinct input-output interfaces, such as a flat-panel display on one side and an alphanumeric keyboard or keypad on the other. This design allows a device to fold in such a way that the two primary sections come into physical contact, thereby offering enhanced portability and protection for the internal components. Such clamshell devices employ a power management system governed by a lid state detection. The state of the lid, either open or closed, is monitored through embedded motion sensors and/or Hall Effect sensors. Based on this, the power management system of the clamshell devices will either transition to an operational power mode or a low-power sleep mode to optimize power consumption. However, there is a need in the art for a more advanced and reliable lid state detection methodology, to enhance both functional efficiency and energy conservation characteristics of the clamshell devices.

SUMMARY OF THE INVENTION

In view of above, it is one object of the present invention to provide an innovative lid state detection methodology primarily based on sound feature comparison. In various embodiments of the present invention, the microphone of a clamshell device is employed to capture surrounding acoustic environment in real-time. To achieve highly accurate lid state detection, the present invention further evaluates motion of the lid section, and only when the motion of the lid section corresponds to closing action or opening action of the lid section, the sound matching process will be initiated. The sound matching process matches captured sound data to pre-loaded sound patterns thereby to discern between the actions of closing and opening the lid section. According to the results derived from the sound pattern matching, a backlight module can be controlled with high precision, thereby achieving enhanced energy efficiency. This refined control not only optimizes energy consumption but also extends the longevity of critical components within the device, contributing to the overall sustainability and operational efficiency of the system.

According to one embodiment, a backlight control device for use in an electronic device is provided, which includes a motion detecting unit, a sound matching unit and a controller. The motion detecting unit is configured to detect motion of a lid section of the electronic device to generate motion data. The sound matching unit is configured to match a soundprint derived from a sound sample that is captured by a sound capture unit, to one or more sound patterns stored within in a sound pattern database to generate a lid state indication signal if the motion data indicates the motion of the lid section corresponds to a predetermined state. The controller is configured to control a backlight module of a display device of the electronic device according to the lid state indication signal.

According to one embodiment, a backlight control method for use in an electronic device is provided. The backlight control method comprises: generating a sound sample by capturing sound around the electronic device; detecting motion of a lid section of the electronic device to generate motion data; matching a soundprint derived from the sound sample to one or more sound patterns stored within in a sound pattern database to generate a lid state indication signal if the motion data indicates the motion of the lid section corresponds to a predetermined state; and controlling a backlight module of a display device of the electronic device according to the lid state indication signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 illustrates composition of a sound pattern database of according to one embodiment of the present invention.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
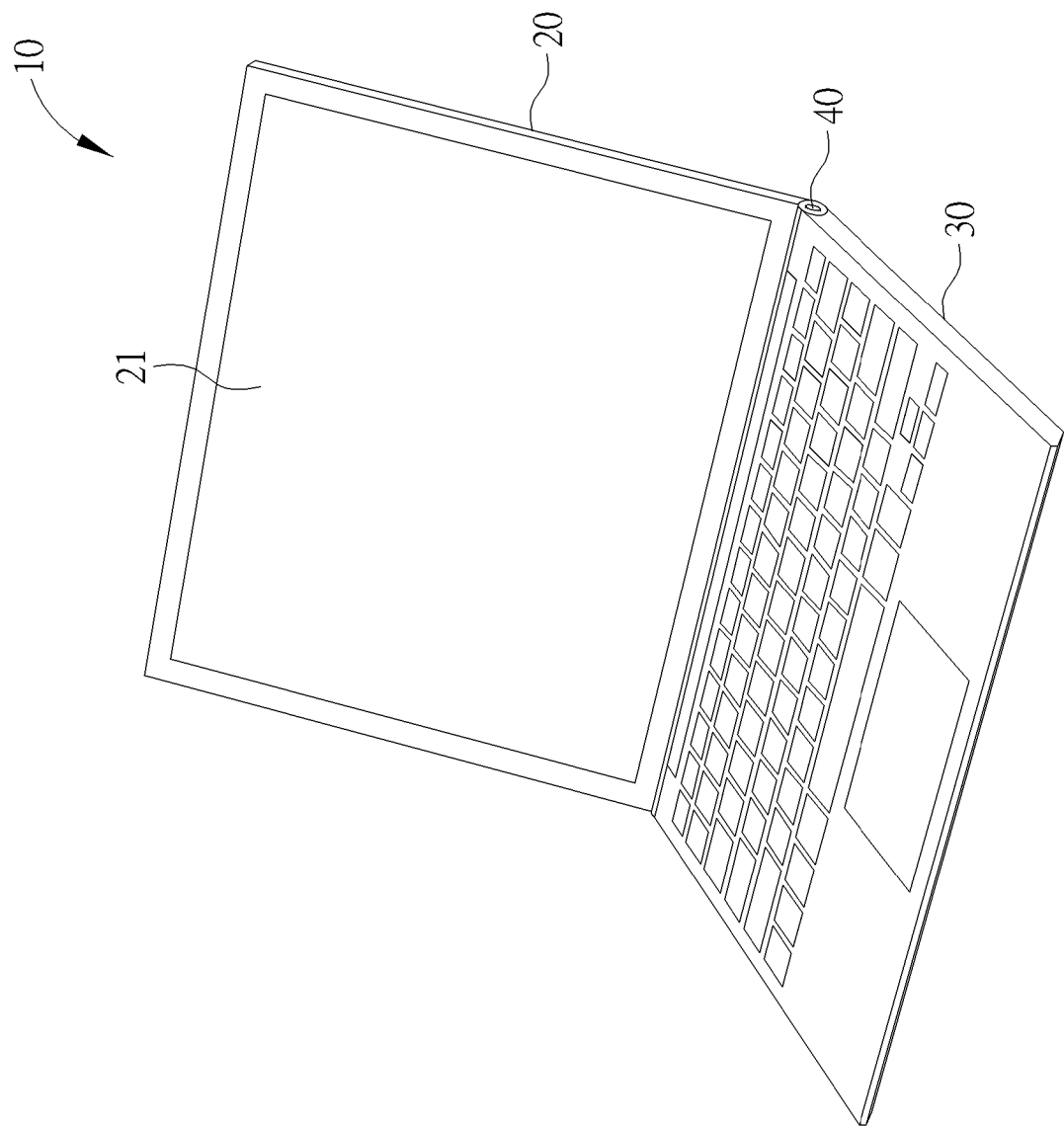
FIG. 1 illustrates an appearance of an electronic device according to one embodiment of the present invention.

FIG. 1 illustrates an appearance of an electronic device according to one embodiment of the present invention. As illustrated, an electronic device 10 could comprise a lid section 20 and a base section 30. According to various embodiments of the present invention, the electronic device 10 could be a laptop computer, a flip mobile phone, a foldable smartphone, a portable gaming console or any other types of electronic devices with clamshell configuration. In addition, there are various components disposed in the lid section 20 or the base section 30.

The lid section 20 houses a display device 21 and may also incorporate supplementary components, such as a webcam, audio speakers, and/or status indicators. The base section 30 predominantly comprises an alphanumeric input interface, such as a keyboard and/or a touchpad. Additionally, the base section 30 houses essential computing system including a central processing unit (CPU), a random-access memory (RAM), and storage devices. The base section 30 also comprises various external I/O ports, such as USB, HDMI, and power connectors, to facilitate interfacing with other peripheral devices (not shown). The lid section 20 and the base section 30 are interconnected by a hinge mechanism 40. The hinge mechanism 40 serving as an articulating joint between the lid section 20 and the base section 30, which allows for the opening and closing of the lid section 20.

Figure 2:
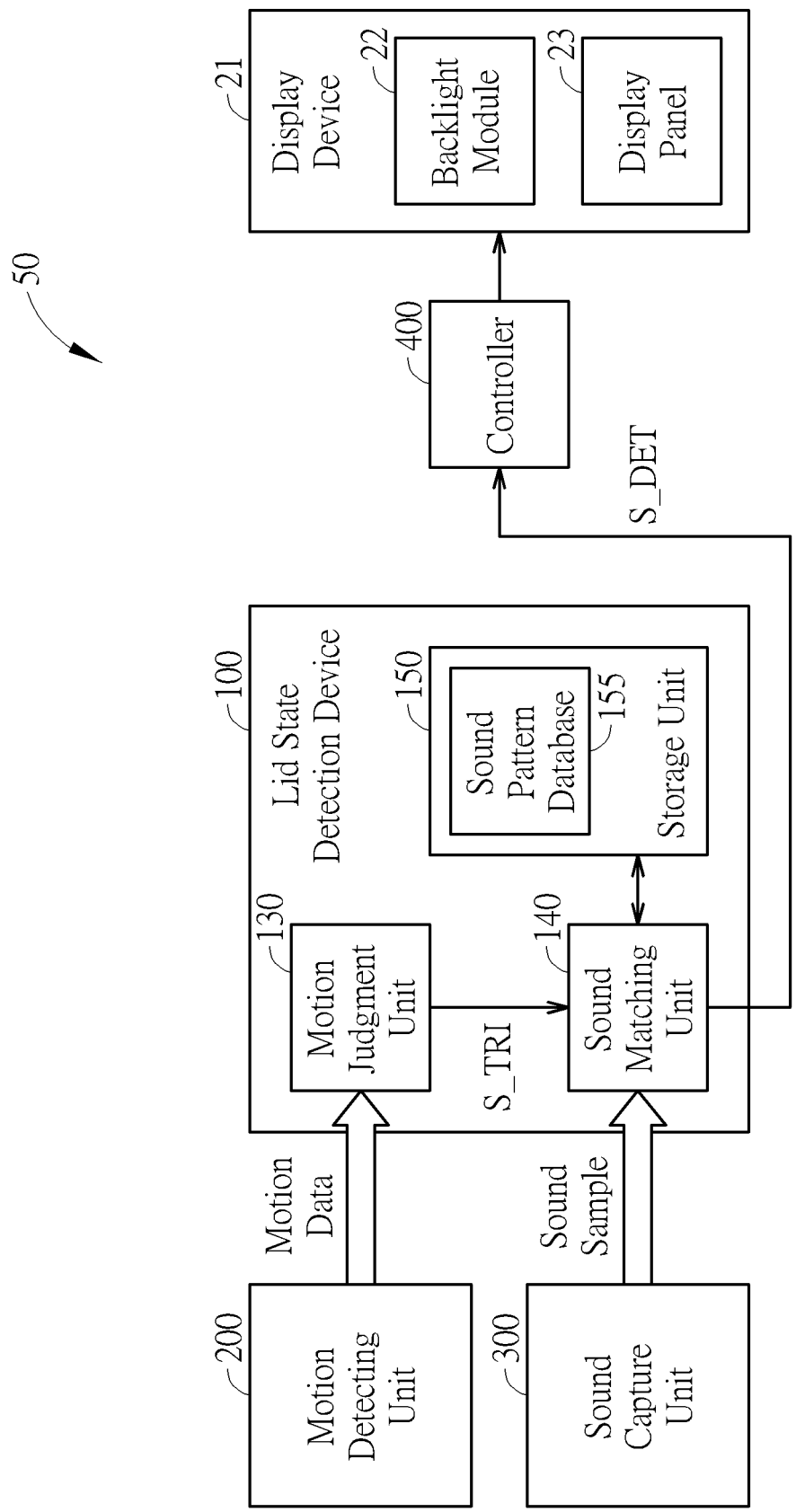
FIG. 2 illustrates a schematic diagram of a backlight control device according to one embodiment of the present invention.

FIG. 2 illustrates a schematic diagram of a backlight control device according to one embodiment of the present invention. A backlight control device 50 comprises a controller 400 to control a backlight module 22 of the display device 21, where the display device 21 further comprises a display panel 23. The controller 400 is operable to activate or deactivate the backlight module 22 of the display device 21 according to a lid state indication signal S_DET. In some embodiments, the controller 400 is operable to activate or deactivate other components or subsystems in the electronic device 10 according to the lid state indication signal S_DET. In some embodiments, the controller 400 is also operable to allow the electronic device 10 to switch between a normal mode or a low-power sleep mode according to lid state indication signal S_DET.

The state indication signal S_DET is generated by the lid state detection device 100, which indicates a state of the lid section 20 (i.e., open or closed). The lid detection device 100 comprises a motion judgment unit 130, a sound matching unit 140 and a storage unit 150. The lid detection device 100 generates the state indication signal S_DET according to information provided by a sound capture unit 300 and a motion detecting unit 200. According to various embodiments of the present invention, the sound capture unit 300 and the motion detecting unit 200 could be either integrated within the lid detection device 100 or belong to specific subsystems of the electronic device 10.

The sound capture unit 300 could be physically disposed in either the lid section 20 or the base section 30 and configured to capture sounds around the electronic device 10 to provide one or more sound samples. In one embodiment, the sound capture unit 300 could comprise one or more microphones, each of which can be of various types. These types can include, but are not limited to, condenser microphone, dynamic microphone, MEMS microphone, ceramic microphone, carbon microphone and electret microphone. Preferably, the sound capture unit 300 could be microphones with always-on operational mode, and keep generating the sound samples.

The motion detecting unit 200 could be physically disposed in the lid section 20 and configured to detection motion of the lid section 20. In one embodiment, the motion detecting unit 200 could comprise only one inertial measurement unit (IMU), which could be a combination of accelerometers, gyroscopes, and/or magnetometers, is capable of measuring and reporting data about specific force, acceleration, angular rate, and orientation of the lid section 20. That is, the motion detecting unit 200 is configured to provide motion data of the lid section 20.

The motion judgment unit 130 could be disposed in the lid section 20 or the body section 30 and configured to generate judge whether the motion of the lid section 20 corresponds to a predetermined state according to the motion data provided by the motion detection unit 200. Specifically, the predetermined state corresponds to a condition where an angle variation formed between the lid section 20 and a base section 30 of the electronic device falls within a first predetermined range and an acceleration exhibited by the lid section 20 falls within a second predetermined range. In other words, the predetermined state is used to determine whether an opening action or a closing action is applying to the lid section 20. In one embodiment, the acceleration exhibited by the lid section 20 must be lower than a reasonable threshold since the force exerted by a human during opening or closing actions will not surpass a certain physical limit. If the motion data corresponding to the predetermined state reflective of the opening action or the closing action is applying to the lid section 20, the motion judgment unit 130 sends a trigger signal S_TRI to trigger the sound matching unit 140.

The sound matching unit 140 could be integrated within either the lid section 20 or the body section 30. When triggered, the sound matching unit 140 is configured to match the one or more sound samples currently generated by the sound capture unit 300 to sound patterns in a pre-existing sound pattern database 155, which is stored in the storage unit 150. The sound pattern database 155 comprises a plurality of sound patterns corresponding to both the opening and closing actions of the lid section 20. The sound patterns corresponding to the opening action (i.e., lid-open sound patterns) of the lid section 20 can be gathered by recording sounds physically produced when lifting/opening the lid section 20. On the other hand, the sound patterns corresponding to the closing action (i.e., lid-close sound patterns) of the lid section 20 can be gathered by recording sounds physically produced when closing/shutting the lid section 20.

Based on the motion data from the lid section, the sound matching unit 140 initially selects sound patterns from the sound pattern database 155 corresponding to either the opening or closing actions of the lid for matching. Additionally, the sound matching unit 140 may convert one or more sound samples into a soundprint and match the soundprint against the selected sound patterns. In some embodiments, the sound pattern matching employs convolutional neural networks (CNN) audio recognition technologies, which are trained to extract distinctive audio features from the sound samples and match them to the respective sound patterns. In such cases, each sound pattern represents a unique audio feature of a closing action or an opening action of the lid section 20, thereby ensuring accurate and efficiency of the lid state detection.

If there is a match between the soundprint and sound patterns in the sound pattern database 155, the sound matching unit 140 could the lid state indication signal S_DET to indicate what action is applying on the lid section 20. If the soundprint matches one or more sound pattern corresponding to the opening action, the lid state indication signal S_DET will be indicative of the opening action of the lid section 20. Accordingly, the controller 400 will activate the backlight module 22. On the other hand, if the soundprint matches one or more sound pattern corresponding to the closing action, the lid state indication signal S_DET will be indicative of the closing action of the lid section 20. Accordingly, the controller 400 will deactivate the backlight module 22.

It should be noted that the lid detection device 100 can be implemented as a system integrating both software and hardware components. This system may employ artificial intelligence (AI) technologies for conducting computations related to sound pattern matching and motion judgment. Hardware circuitry of the system could potentially consist of microcontroller unit (MCU), digital signal processor (DSP), graphics processing unit (GPU), or even a specialized application-specific integrated circuit (ASIC). Moreover, the system is equipped with random access memory (RAM) to buffer sound samples originated by the sound capture unit 300, motion data produced by the motion detecting unit 200, and/or to store computation data or results temporarily. Additionally, the system encompasses specific interfaces, such as I2S and SPI, for receiving sound samples and motion data, and for transmitting the lid state detection signal S_DET to the controllers 400.

Figure 3:
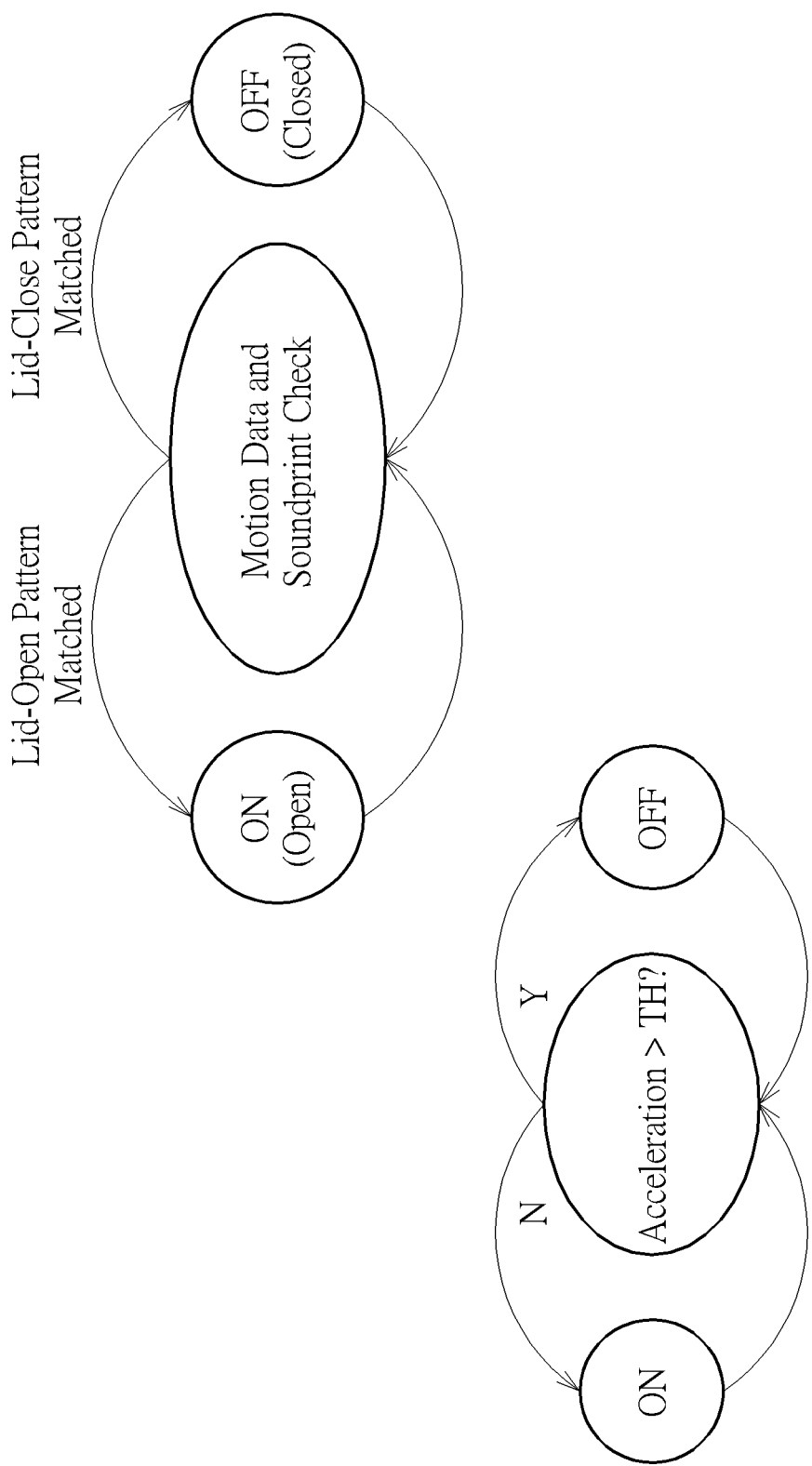
FIG. 3 illustrates state diagrams of the lid state detection and backlight control.

FIG. 3 illustrates state diagrams of the lid state and backlight control. The right state diagram shows the backlight module 22 will be OFF if the lid-close sound pattern is matched to (i.e., closing action is detected), while the backlight module 22 will be ON if the lid-close sound pattern is matched to (i.e., opening action is detected). The left state diagram shows how an activated or turned-on backlight module 22 will be controlled according to the acceleration exhibited by the lid section 20. That is, if the acceleration exceeds a threshold TH, the backlight module 22 will be deactivated or tuned off for protection purposes; otherwise, the backlight module 22 will remain activated or tuned on.

Due to wear and tear or long-term usage, structural integrity of the electronic device 10 may be compromised, structural and mechanical deformations can occur. These deformations could alter sound characteristics generated during the opening and closing actions of the lid section 20. Such variations necessitate periodic updates to the sound patterns within the sound pattern database 155, thereby to ensure that the sound matching unit 140 can accurately identify the state of the lid section 20. Please refer to FIG. 4 for further understandings. As illustrated, the sound pattern database 115 comprises a preload part and an auto update part. Both the preload and auto update parts comprise lid-close sound patterns (e.g., pattern_c1-pattern_c7) and lid-open sound patterns (e.g., pattern_o1-pattern_o7). However, the lid-close and lid-open sound patterns in the preload part are pre-recorded at the time of manufacture, and the lid-close and lid-open sound patterns in the auto update part are progressively added or updated during daily use. Specifically, the lid-close and lid-open sound patterns can be automatically added by the sound matching unit 140 or manually inputted by human intervention, depending on the user preference or system requirements.

In one embodiment, the sound matching unit 140 is configured to replace a specific sound pattern in the sound pattern database 155 with the soundprint if there is a match between the soundprint and the specific sound pattern in the sound pattern database 155. In one embodiment, the sound matching unit 140 is configured to add the soundprint into the sound pattern database 155 as a new sound pattern if there is a match between the soundprint and a specific sound pattern in the sound pattern database 155.

Figure 5:
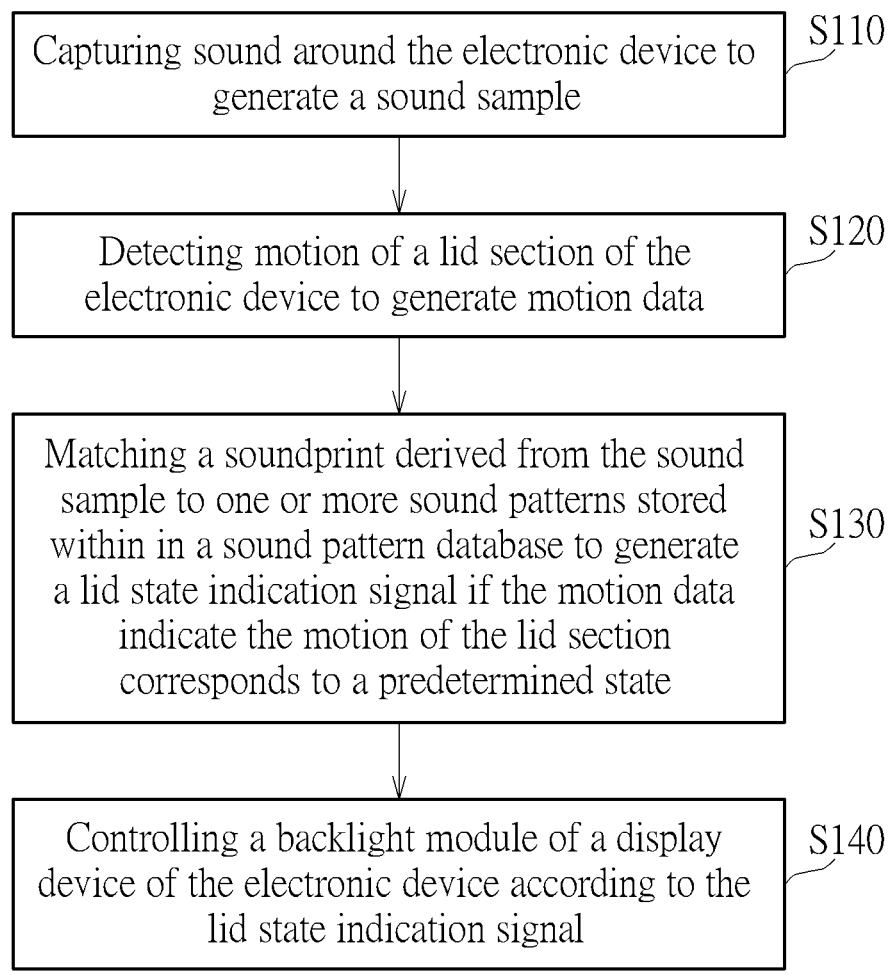
FIG. 5 illustrates a flow chart of a backlight control method according to one embodiment of the present invention.

FIG. 5 illustrates a flow chart of a backlight control method according to one embodiment of the present invention. As shown in the figure, the method of the present invention includes the following simplified flow:

S110: capturing sound around the electronic device to generate a sound sample;

S120: detecting motion of a lid section of the electronic device to generate motion data;

S130: matching a soundprint derived from the sound sample to one or more sound patterns stored within in a sound pattern database to generate a lid state indication signal if the motion data indicates the motion of the lid section corresponds to a predetermined state; and S140: controlling a backlight module of a display device of the electronic device according to the lid state indication signal.

Since principles and specific details of the foregoing steps have been explained in detail through the above embodiments, further descriptions will not be repeated here. It should be noted that the above flow may be possible, by adding other extra steps or making appropriate modifications and adjustments, to better improve accuracy and efficiency of lid state detection and/or backlight control.

In summary, the present invention delivers a highly accurate and reliable lid state detection mechanism based on motion detection as well as sound feature comparison, thereby enhancing power management and user interaction in portable electronic devices, particularly those with clamshell devices.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A backlight control device for use in an electronic device, comprising:
   a motion detecting unit, configured to detect motion of a lid section of the electronic device to generate motion data;
   a sound matching unit, configured to match a soundprint derived from a sound sample that is captured by a sound capture unit, to one or more sound patterns stored within in a sound pattern database to generate a lid state indication signal if the motion data indicates the motion of the lid section corresponds to a predetermined state; and
   a controller, configured to control a backlight module of a display device of the electronic device according to the lid state indication signal.

2. The backlight control device of claim 1, wherein the predetermined state corresponds to a condition where an angle variation formed between the lid section and a base section of the electronic device falls within a first predetermined range and an acceleration exhibited by the lid section falls within a second predetermined range.

3. The backlight control device of claim 1, wherein the motion detecting unit comprises an inertial measurement unit (IMU).

4. The backlight control device of claim 1, wherein the sound matching unit is configured to select a plurality of specific sound patterns from the sound pattern database according to the motion data, and match the soundprint only to the selected specific sound patterns to generate the lid state indication signal.

5. The backlight control device of claim 1, wherein the sound matching unit is configured to replace a specific sound pattern in the sound pattern database with the soundprint if there is a match between the soundprint and the specific sound pattern in the sound pattern database.

6. The backlight control device of claim 1, wherein the sound matching unit is configured to add the soundprint to the sound pattern database as a new sound pattern if there is a match between the soundprint and a specific sound pattern in the sound pattern database.

7. The backlight control device of claim 1, wherein the controller is further configured to deactivate the backlight module if an acceleration exhibited by the lid section exceeds a predetermined limit.

8. A backlight control method for use in an electronic device, comprising:
   generating a sound sample by capturing sound around the electronic device;
   detecting motion of a lid section of the electronic device to generate motion data;
   matching a soundprint derived from the sound sample to one or more sound patterns stored within in a sound pattern database to generate a lid state indication signal if the motion data indicates the motion of the lid section corresponds to a predetermined state; and
   controlling a backlight module of a display device of the electronic device according to the lid state indication signal.

9. The backlight control method of claim 8, wherein the predetermined state corresponds to a condition where an angle variation formed between the lid section and a base section of the electronic device falls within a first predetermined range and an acceleration exhibited by the lid section falls within a second predetermined range.

10. The backlight control method of claim 8, wherein the motion detecting unit comprises an inertial measurement unit (IMU).

11. The backlight control method of claim 8, further comprising:
    selecting a plurality of specific sound patterns from the sound pattern database according to the motion data; and
    matching the soundprint only to the selected specific sound patterns to generate the lid state indication signal.

12. The backlight control method of claim 8, further comprising:
    replacing a specific sound pattern in the sound pattern database with the soundprint if there is a match between the soundprint and the specific sound pattern in the sound pattern database.

13. The backlight control method of claim 8, further comprising:
    adding the soundprint to the sound pattern database as a new sound pattern of if there is a match between the soundprint and a specific sound pattern in the sound pattern database.

14. The backlight control method of claim 8, further comprising:
    deactivating the backlight module if an acceleration exhibited by the lid section exceeds a predetermined limit.

* * * * *